United States Patent
Alexander et al.

(10) Patent No.: US 8,109,567 B2
(45) Date of Patent: Feb. 7, 2012

(54) ACTIVE MATERIAL ACTUATED HEADREST UTILIZING BAR LINKAGE DEPLOYMENT SYSTEM

(75) Inventors: Paul W. Alexander, Ypsilanti, MI (US);
Michael G. Carpenter, Romeo, MI (US); Leigh A. Berger, Brighton, MI (US); Dale M. Drew, Grosse Pointe Farms, MI (US); Michael E Kilpinen, Rochester Hills, MI (US); Clayton J Hayes, Romeo, MI (US); James A Smith, Armada, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 295 days.

(21) Appl. No.: 12/477,238

(22) Filed: Jun. 3, 2009

(65) Prior Publication Data
US 2010/0140987 A1    Jun. 10, 2010

Related U.S. Application Data

(63) Continuation-in-part of application No. 11/554,753, filed on Oct. 31, 2006, now Pat. No. 7,556,313.

(60) Provisional application No. 61/059,561, filed on Jun. 6, 2008.

(51) Int. Cl.
*B60N 2/48* (2006.01)

(52) U.S. Cl. .................. 297/216.12; 297/391

(58) Field of Classification Search .......... 297/216.12, 297/391, 408
See application file for complete search history.

(56) References Cited

U.S. PATENT DOCUMENTS

| | | | |
|---|---|---|---|
| 6,213,548 B1 * | 4/2001 | Van Wynsberghe et al. | 297/216.12 |
| 6,688,697 B2 * | 2/2004 | Baumann et al. | 297/391 |
| 7,344,191 B2 * | 3/2008 | Schilling et al. | 297/216.12 |
| 7,448,678 B2 * | 11/2008 | Browne et al. | 297/216.12 |
| 7,556,313 B2 * | 7/2009 | Browne et al. | 297/216.12 |
| 7,618,091 B2 * | 11/2009 | Akaike et al. | 297/216.12 |
| 7,758,121 B2 * | 7/2010 | Browne et al. | 297/284.11 |
| 2007/0241593 A1 * | 10/2007 | Woerner | 297/216.12 |
| 2007/0246979 A1 | 10/2007 | Browne et al. | |
| 2008/0100118 A1 * | 5/2008 | Young et al. | 297/404 |
| 2008/0252113 A1 * | 10/2008 | Alexander et al. | 297/216.12 |

FOREIGN PATENT DOCUMENTS

| EP | 1526982 B1 | 3/2006 |
|---|---|---|
| JP | 2005-13604 A | 1/2005 |
| KR | 10-0680721 B1 | 2/2007 |

* cited by examiner

*Primary Examiner* — Peter R. Brown

(57) ABSTRACT

An active headrest for selectively supporting the head of an occupant, includes a shell, and an actuator disposed within the shell, including a bar linkage system drivenly coupled to the shell, so as to adjust the distance or engagement between the shell and head when displaced, and an active material element drivenly coupled to the system, so as to cause or enable the displacement of the system, and preferably further including a ratchet sector/pawl and latch cooperating to present plural achievable deployment positions.

16 Claims, 4 Drawing Sheets

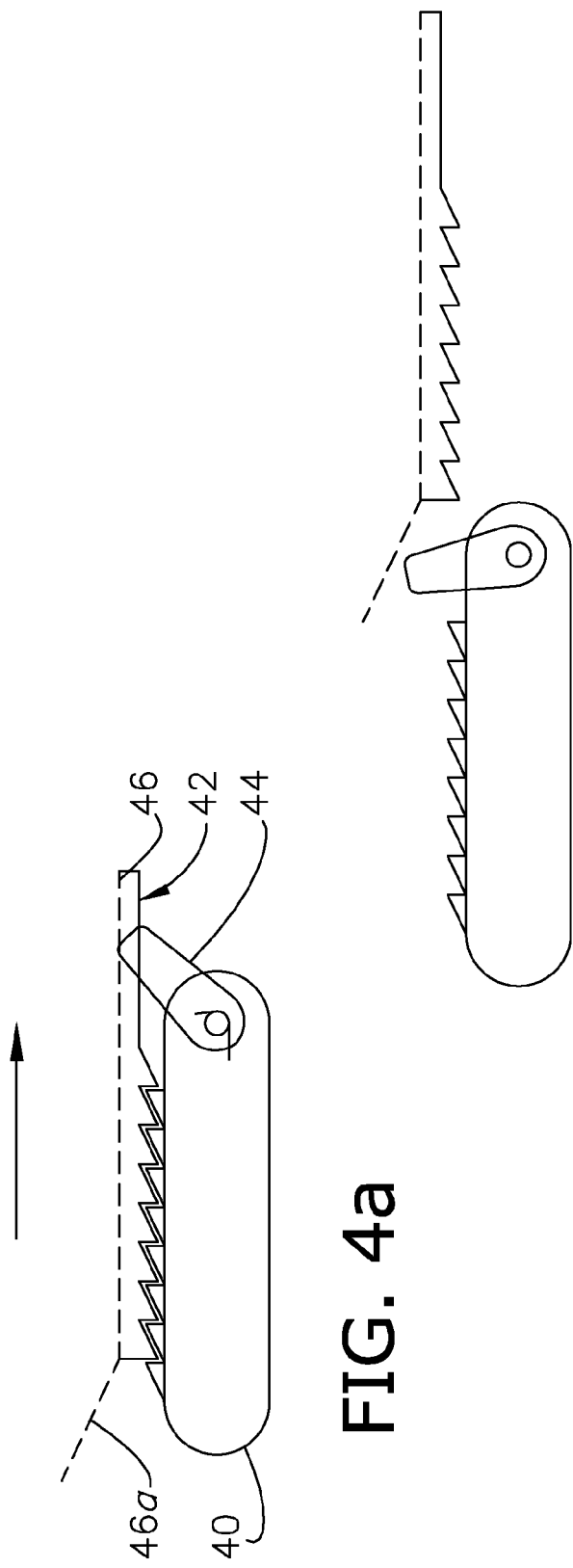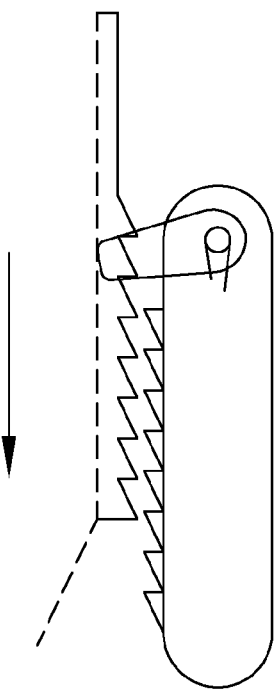

ACTIVE MATERIAL ACTUATED HEADREST UTILIZING BAR LINKAGE DEPLOYMENT SYSTEM

RELATED APPLICATIONS

This patent application claims priority to, and benefit from U.S. Provisional Patent Application Ser. No. 61/059,561, entitled "ACTIVE MATERIAL ACTUATED HEADREST HAVING BAR LINKAGE DEPLOYMENT SYSTEM," filed on Jun. 6, 2008, and is a continuation-in-part of U.S. patent application Ser. No. 11/554,753, entitled "ACTIVE MATERIAL ACTUATED HEADREST ASSEMBLIES" and filed on Oct. 31, 2006, both of which are hereby incorporated by reference herein.

BACKGROUND OF THE INVENTION

1. Field of the Invention

The present disclosure relates to adjustable headrest assemblies, and more particularly, to an adjustable headrest having an active material actuator and bar-linkage deployment system.

2. Discussion of Prior Art

As is known in the art, headrest assemblies adapted for use with a seatback are commonly used to provide comfort and protection to a user. More particularly, when an occupant is properly positioned within the associated seat, the headrest is preferably aligned with and functions to support the head of the occupant. In an automotive setting, for example, the headrest may function to protect the head during an accident by minimizing the rearward displacement and attainable acceleration of the head resulting from impact.

Autonomously manipulable (or "active") headrests have been developed that change absolute positioning, so as to selectively reduce the intermediate distance between the headrest and head. In an automotive setting, for example, manipulation may be effected when a crash event is detected or predicted. Conventional active headrests typically employ electrical, mechanical, or pneumatic actuators and complex architecture, which present various concerns in the art. For example, it is appreciated that a measurable load upon the vehicle charging system, a crowded interior headrest region, and a large plurality of moving parts resulting in greater manufacturing, repair and replacement costs are just a few of the concerns.

BRIEF SUMMARY OF THE INVENTION

The present invention addresses these concerns, and presents a headrest that employs active material actuation and a bar linkage system to selectively manipulate (e.g., adjust the positioning or compliance of) the headrest. As such, the headrest described herein is useful for alternatively providing increased comfort and protection autonomously or on demand.

In general, an active headrest adapted for use with a seat, and to selectively support the head of an occupant is presented. The headrest includes an exterior shell defining an interior space and outer surface configured to engage the head of the occupant. An actuator is disposed within the space, and operable to adjust the distance between the surface and head. The actuator includes a bar linkage system presenting at least one selectively deployable swing arm pivotally coupled to the seat and shell, such that pivoting the arm causes the shell to translate relative to the seat. The actuator further includes an active material element operable to cause or enable the arm to pivot, when exposed to or occluded from an activation signal. Finally, the headrest, and more particularly, the actuator is communicatively coupled to a power source operable to generate the signal.

The above described and other features are exemplified by the following figures and detailed description.

BRIEF DESCRIPTION OF THE DRAWINGS

Preferred embodiments of the invention are described in detail below with reference to the attached drawing figures of exemplary scale, wherein:

FIG. 4a is a side elevation of a cam engaging a channel defined by the sector, during translation in a first direction when the pawl and sector are engaged, in accordance with a preferred embodiment of the invention;

FIG. 4b is a side elevation of the cam and channel shown in FIG. 4a, wherein the cam has reached a depression in the channel and has been caused to flip by a spring bias; and FIG. 4c is a side elevation of the cam and channel shown in FIGS. 4a,b, wherein the cam forces the pawl and sector to disengage so as to allow translation in the opposite direction.

DETAILED DESCRIPTION

Figure 1:
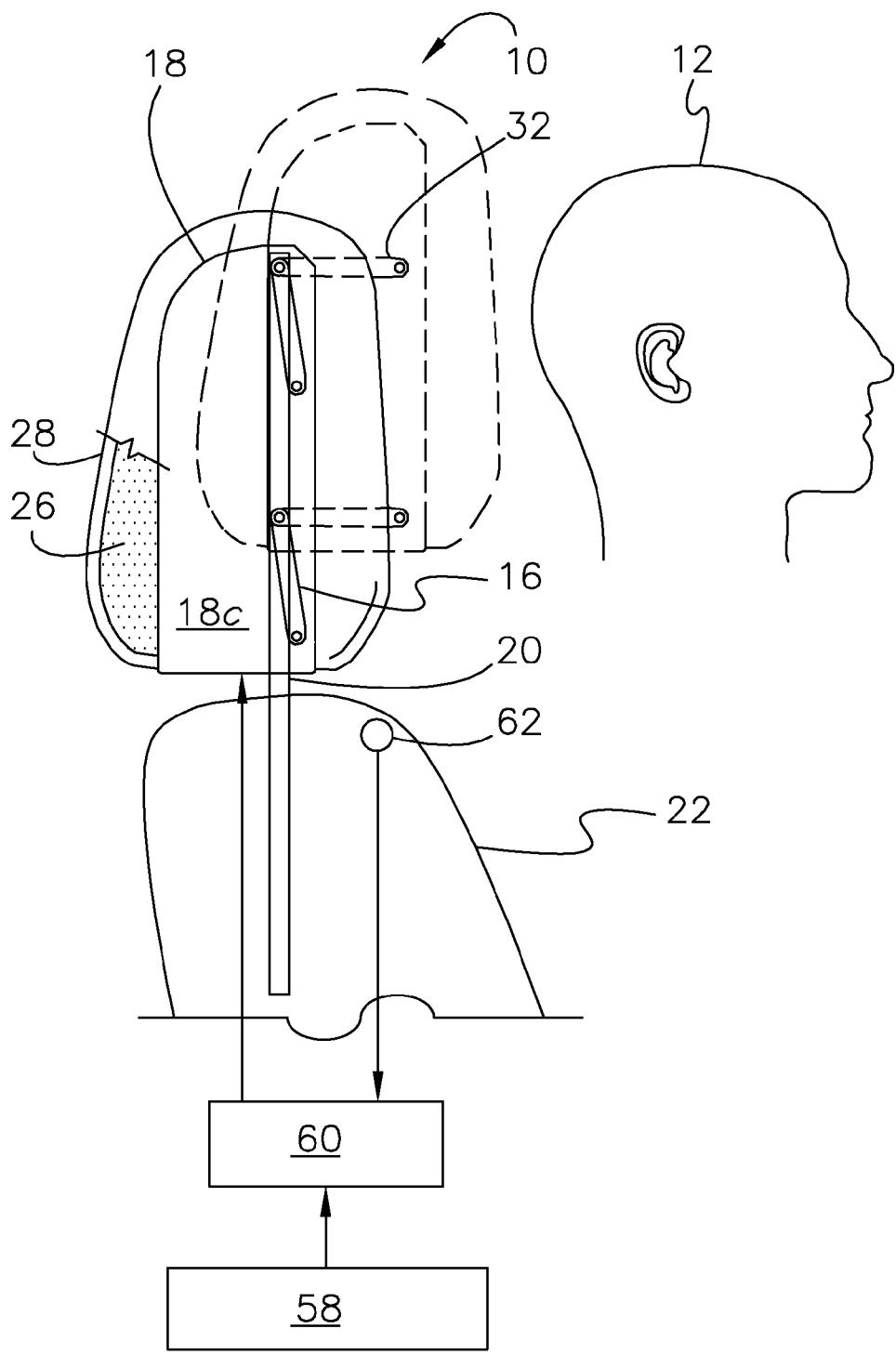
FIG. 1 is a side elevation of an active headrest translatable between stowed (solid-line type) and deployed (hidden-line type) conditions, and the head of an occupant, particularly illustrating a four-bar linkage system, in accordance with a preferred embodiment of the invention.
Figure 2:
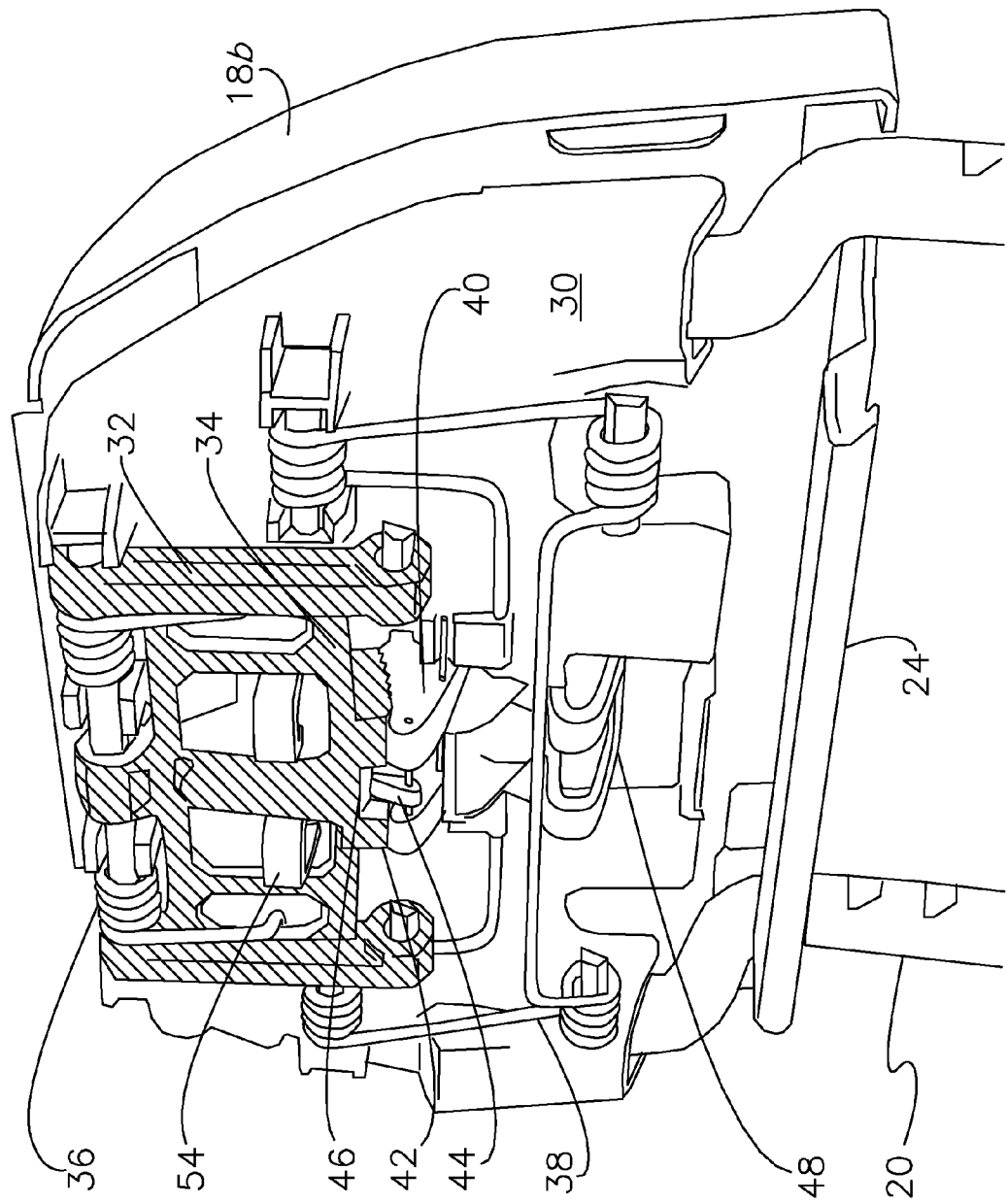
FIG. 2 is a front perspective view of the inner-workings of the active headrest including an upper link arm, upper torsion springs, lower spring arm, travel stops, main carrier plate, shell back, and posts, in accordance with a preferred embodiment of the invention.
Figure 3:
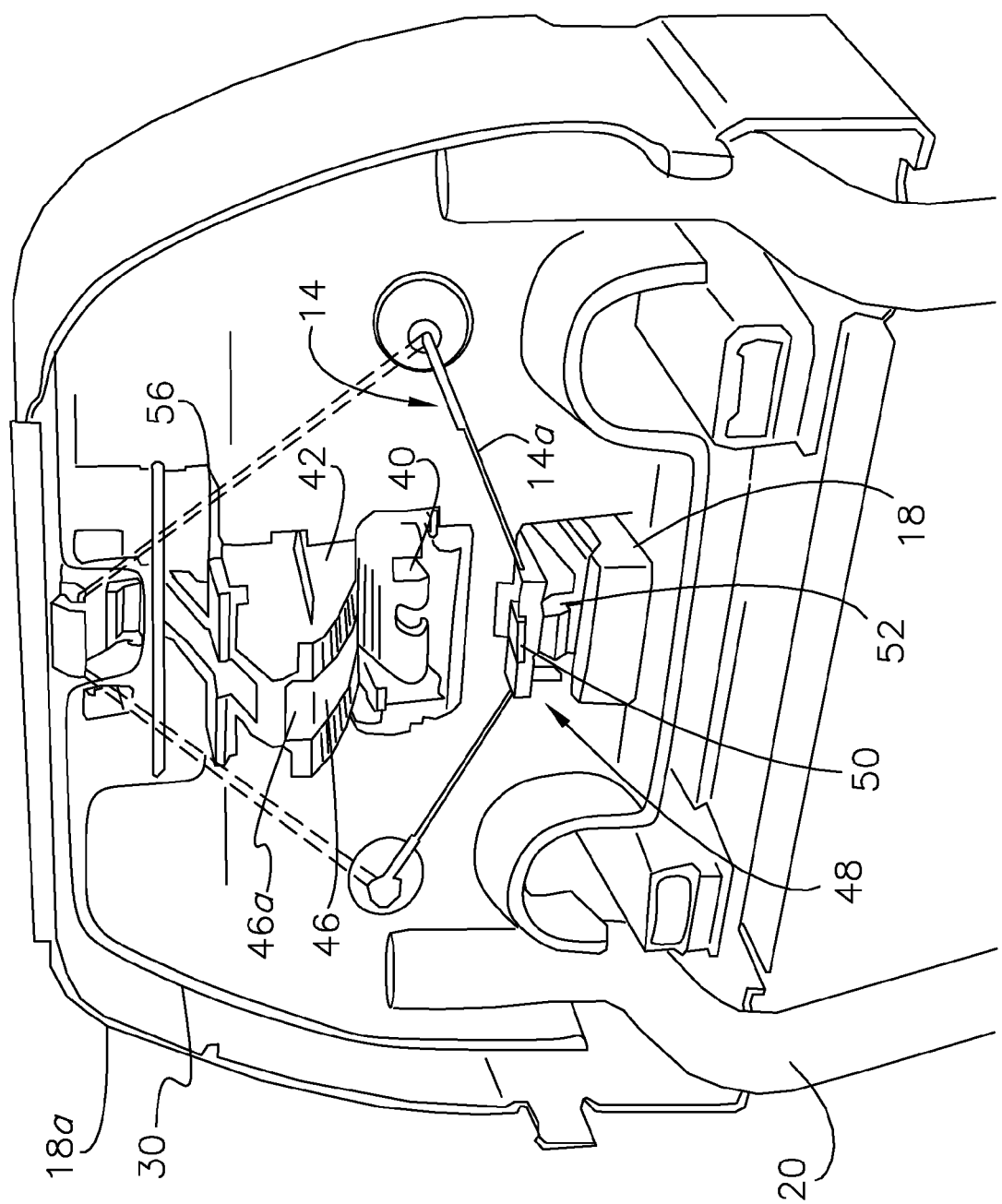
FIG. 3 is a rear perspective view of the inner-workings of the headrest shown in FIG. 2, particularly illustrating the shell front, carrier plate, and posts of FIG. 2, as well as a ratcheting sector and pawl, latch, and a shape memory wire alternatively engaging the latch and sector, in accordance with a preferred embodiment of the invention.

Disclosed herein is an active headrest 10 adapted to selectively support the head 12 of an occupant (FIG. 1) that continues-in-part from the '753 application (particularly, FIG. 8 and associated description therein). The active headrest 10 disclosed herein can be employed in front seats, back seats, child seats, and the like, and in association with various applications, such as vehicle transportation, airlines, entertainment seats, etc. The headrest 10 includes an active (or "smart") material actuator 14 and bar linkage system 16 that cooperate to manipulate (e.g., translate, reposition, etc.) at least a portion of the headrest 10 (FIGS. 1-3).

Active Material Discussion and Functionality

As used herein the term "active material" is defined as those materials or composites that exhibit a reversible change in a fundamental (i.e., chemical or intrinsic physical) property when subjected to an activation signal. Suitable active materials for use herein include, without limitation, shape memory alloys (SMA), and ferromagnetic SMAs (FSMA). Other active materials that may be utilized, with some changes to the proffered embodiments, include, but are not limited to, piezoelectric materials, electroactive polymers (EAP), magneto- and electrostrictives, and the like. Depending on the particular active material, the activation signal can take the form of, without limitation, an electric current, a temperature change, a magnetic field, a mechanical loading or stressing, or the like.

More particularly, shape memory alloys exist in several different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature (As). The temperature at which this phenomenon is complete is called the austenite finish temperature (Af). When the shape memory alloy is in the austenite phase and is cooled, it begins to change into the martensite phase, and the temperature at which this phenomenon starts is referred to as the martensite start temperature (Ms). The temperature at which austenite finishes transforming to martensite is called the martensite finish temperature (Mf). Generally, the shape memory alloys are softer and more easily deformable in their martensitic phase and are harder, stiffer, and/or more rigid in the austenitic phase. In view of the foregoing, a suitable activation signal for use with shape memory alloys is a thermal activation signal having a magnitude to cause transformations between the martensite and austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the martensite to austenite type transition, and the material will recover the original, annealed shape. Hence, one-way shape memory effects are only observed upon heating.

The temperature at which the shape memory alloy remembers its high temperature form when heated can be adjusted by slight changes in the composition of the alloy and through heat treatment. In nickel-titanium shape memory alloys, for instance, it can be changed from above about 130° C. to below about −100° C. The shape recovery process occurs over a range of just a few to several degrees and the start or finish of the transformation can be controlled to within a degree or two depending on the desired application and alloy composition. It is appreciated that the mechanical properties of the shape memory alloy vary greatly over the temperature range spanning their transformation.

SMA materials exhibit a modulus increase of 2.5 times and a dimensional change of up to 8% (depending on the amount of pre-strain) when heated above its so-called martensite to austenite phase transition temperature. The SMA can be embedded within the headrest in wire form to provide the desired amount of contraction or change in stiffness properties, wherein the term "wire" is non-limiting and shall incorporate other suitable geometric shapes, such as cables, bundles, braids, ropes, straps, etc. SMA changes are also one-way so that a biasing force return mechanism (such as a spring) may be included within the headrest to return the SMA (and the headrest) to its starting configuration once the applied field/heat is removed. Other return mechanisms may include mechanical, pneumatic, hydraulic, or pyrotechnic technology, or be based on one of the aforementioned smart materials.

Suitable shape memory alloy materials include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape orientation, changes in yield strength, and/or flexural modulus properties, damping capacity, superelasticity, and the like. Selection of a suitable shape memory alloy composition depends on the temperature range where the component will operate.

Ferromagnetic SMA's exhibit rapid dimensional changes of up to several percent in response to (and proportional to the strength of) an applied magnetic field. The changes are one-way changes and require the application of either a biasing force or a field reversal to return the ferromagnetic SMA to its starting configuration. Otherwise, for the intents and purposes of the present invention, FSMA functions equivalently to SMA.

Similarly, magnetostrictives are solids that develop a large mechanical deformation when subjected to an external magnetic field. This magnetostriction phenomenon is attributed to the rotations of small magnetic domains in the materials, which are randomly oriented when the material is not exposed to a magnetic field. The shape change is largest in ferromagnetic or ferrimagnetic solids. Terfinol D is the most thoroughly explored form of magnetostrictive. Magentisricgtvies exhibit a relatively high frequency capability, strain is proportional to the strength of the applied magnetic field, and these types of materials return to their starting dimension upon removal of the applied field.

Shape memory polymers (SMP) exhibit a dramatic drop in modulus when heated above the glass transition temperature of that of their constituents that has a lower glass transition temperature. If loading/deformation is maintained while the temperature is dropped, the deformed shape will be set in the SMP until it is reheated while under no load under which condition it will return to its as-molded shape. When heated their modulus drops by a factor of 30 or more and in this flexible state the stored energy could no longer be blocked by the SMP and would thus be released in this manner allowing the front surface of the headrest to be displaced toward the head of the seated occupant.

Most SMPs exhibit a "one-way" effect, wherein the SMP exhibits one permanent shape. Generally, SMPs are phase segregated co-polymers comprising at least two different units, which may be described as defining different segments within the SMP, each segment contributing differently to the overall properties of the SMP. As used herein, the term "segment" refers to a block, graft, or sequence of the same or similar monomer or oligomer units, which are copolymerized to form the SMP. Each segment may be crystalline or amorphous and will have a corresponding melting point or glass transition temperature (Tg), respectively. The term "thermal transition temperature" is used herein for convenience to generically refer to either a Tg or a melting point depending on whether the segment is an amorphous segment or a crystalline segment. For SMPs comprising (n) segments, the SMP is said to have a hard segment and (n−1) soft segments, wherein the hard segment has a higher thermal transition temperature than any soft segment. Thus, the SMP has (n) thermal transition temperatures. The thermal transition temperature of the hard segment is termed the "last transition temperature", and the lowest thermal transition temperature of the so-called "softest" segment is termed the "first transition temperature". It is important to note that if the SMP has multiple segments characterized by the same thermal transition temperature, which is also the last transition temperature, then the SMP is said to have multiple hard segments.

When the SMP is heated above the last transition temperature, the SMP material can be shaped. A permanent shape for the SMP can be set or memorized by subsequently cooling the SMP below that temperature. As used herein, the terms "original shape", "previously defined shape", and "permanent shape" are synonymous and are intended to be used interchangeably. A temporary shape can be set by heating the material to a temperature higher than a thermal transition temperature of any soft segment yet below the last transition temperature, applying an external stress or load to deform the SMP, and then cooling below the particular thermal transition temperature of the soft segment.

The permanent shape can be recovered by heating the material, with the stress or load removed, above the particular thermal transition temperature of the soft segment yet below the last transition temperature. Thus, it should be clear that by combining multiple soft segments it is possible to demonstrate multiple temporary shapes and with multiple hard segments it may be possible to demonstrate multiple permanent shapes. Similarly using a layered or composite approach, a combination of multiple SMPs will demonstrate transitions between multiple temporary and permanent shapes.

For SMPs with only two segments, the temporary shape of the shape memory polymer is set at the first transition temperature, followed by cooling of the SMP, while under load, to lock in the temporary shape. The temporary shape is maintained as long as the SMP remains below the first transition temperature. The permanent shape is regained when the SMP is once again brought above the first transition temperature. Repeating the heating, shaping, and cooling steps can repeatedly reset the temporary shape.

Most SMPs exhibit a "one-way" effect, wherein the SMP exhibits one permanent shape. Upon heating the shape memory polymer above a soft segment thermal transition temperature without a stress or load, the permanent shape is achieved and the shape will not revert back to the temporary shape without the use of outside forces.

As an alternative, some shape memory polymer compositions can be prepared to exhibit a "two-way" effect, wherein the SMP exhibits two permanent shapes. These systems include at least two polymer components. For example, one component could be a first cross-linked polymer while the other component is a different cross-linked polymer. The components are combined by layer techniques, or are interpenetrating networks, wherein the two polymer components are cross-linked but not to each other. By changing the temperature, the shape memory polymer changes its shape in the direction of a first permanent shape or a second permanent shape. Each of the permanent shapes belongs to one component of the SMP. The temperature dependence of the overall shape is caused by the fact that the mechanical properties of one component ("component A") are almost independent from the temperature in the temperature interval of interest. The mechanical properties of the other component ("component B") are temperature dependent in the temperature interval of interest. In one embodiment, component B becomes stronger at low temperatures compared to component A, while component A is stronger at high temperatures and determines the actual shape. A two-way memory device can be prepared by setting the permanent shape of component A ("first permanent shape"), deforming the device into the permanent shape of component B ("second permanent shape"), and fixing the permanent shape of component B while applying a stress.

It should be recognized by one of ordinary skill in the art that it is possible to configure SMPs in many different forms and shapes. Engineering the composition and structure of the polymer itself can allow for the choice of a particular temperature for a desired application. For example, depending on the particular application, the last transition temperature may be about 0° C. to about 300° C. or above. A temperature for shape recovery (i.e., a soft segment thermal transition temperature) may be greater than or equal to about −30° C. Another temperature for shape recovery may be greater than or equal to about 20° C.

Another temperature for shape recovery may be greater than or equal to about 70° C. Another temperature for shape recovery may be less than or equal to about 250° C. Yet another temperature for shape recovery may be less than or equal to about 200° C. Finally, another temperature for shape recovery may be less than or equal to about 180° C. Suitable polymers for use in the SMPs include thermoplastics, thermosets, interpenetrating networks, semi-interpenetrating networks, or mixed networks of polymers. The polymers can be a single polymer or a blend of polymers. The polymers can be linear or branched thermoplastic elastomers with side chains or dendritic structural elements.

Suitable polymer components to form a shape memory polymer include, but are not limited to, polyphosphazenes, poly(vinyl alcohols), polyamides, polyester amides, poly (amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsesquioxane), polyvinyl chloride, urethane/butadiene copolymers, polyurethane block copolymers, styrene-butadiene-styrene block copolymers, and the like, and combinations comprising at least one of the foregoing polymer components. Examples of suitable polyacrylates include poly(methyl methacrylate), poly(ethyl methacrylate), poly(butyl methacrylate), poly (isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). The polymer(s) used to form the various segments in the SMPs described above are either commercially available or can be synthesized using routine chemistry. Those of skill in the art can readily prepare the polymers using known chemistry and processing techniques without undue experimentation.

II. Exemplary Active Headrests and Methods of Use

As shown in FIGS. 1-3, the headrest 10 includes a shell 18 preferably formed of a front contact portion 18a and a back portion 18b, which cooperate to form an interior space 18c. For example, a one-piece outer folding clam shell may be used, wherein the front portion 18a is the portion of the headrest 10 proximate to the head 12. As shown in FIG. 1, it is appreciated that the shell 18 may present an integral structure, so as to be moved in unison. In lieu of displacing the headrest 10, it is appreciated that the system 16 and actuator 14 may be alternatively configured to bear against, so as to provide additional resistance or energy absorption capability to, an otherwise stationary front surface of the headrest 10. That is to say the system 16 and actuator 14 may also be used to adjust the engagement between the headrest 10 and head 12. In this configuration, the shell 18 defines a conformable outer front surface operable to transfer the additional resistance or absorption capability.

The headrest 10 is supported by at least one structural support post 20 slidably disposed within the seatback 22, and fixedly secured relative thereto via locking means (not shown). To enable movement relative to the posts 20, the shell 18 defines a lower opening through which each post 20 enters the space 18c and is able to translate. More preferably, the shell 18 defines slotted openings having a width congruent to the post diameter, so as to effect linear translation. A removable trim cover clip 24 is provided to otherwise cover and selectively allow access to the space 18c. The preferred headrest 10 further includes a padding material 26 exterior to and forming superjacent layers with the shell 18, and an outer covering 28 (of soft durable material) encasing the padding material 26 to define the overall shape of the headrest 10.

The shell 10 may be in pivotal communication with the structural support post 20, or as illustrated, fixedly secured thereto (FIG. 2). The structural support posts 20 can take many forms and are not intended to be limited to that shown. For example, it is appreciated that a wishbone or goal type post structure can be used. Moreover, more or less than two posts 18 can be employed. Finally, the fixed structure of the preferred headrest 10 further includes a main carrier plate 30 that is secured to the posts 20 and provides a flat planar surface, which serves as a base for the actuator 14, and bar-linkage system 16.

The preferred bar-linkage deployment system (i.e., "bar linkage") 16 comprises at least one, and more preferably, a plurality of laterally paired swing arms 32. As shown in FIG. 1, the swing arms 30 are pivotally coupled to the shell 18 and fixed structure (e.g., posts 20, plate 30, etc.), preferably at or near their distal ends. The arms 32 are inter-linked to effect congruent motion. More preferably, a parallel four-bar linkage system 16 may be employed, consisting of cross-bars 34 between lateral swing arms 32, and lateral vertical braces (not shown) between vertically spaced arms 32. In the illustrated embodiment, the preferably rigid structure of the shell 18 supplants the vertical braces. For each set of lateral arms 32, the pivot axis defined by the fixed structure and arms 32 is translatably fixed, while the outer pivot axis connected to the shell 18 is free to translate. As such, when the swing arms 32 are caused to pivot counter-clockwise, the shell 18 and headrest 10 are driven outward (e.g., away from the posts 20) and upward towards a deployed position, as shown by hidden-line type in FIG. 1.

In the illustrated embodiment, deployment is provided by releasing energy stored within upper and/or lower torsion springs 36,38 (FIGS. 2 and 3). The spring(s) 36,38 are preferably sized such that deployment is performed in a controlled manner. More preferably, and as shown in FIG. 2, the lower spring 38 also serve as the lower link arm. In this configuration, when deployed a normally closed lower spring 38 may be configured to store energy that is later used to assist return to the stowed position when released. Alternatively, it is appreciated that other types of spring (e.g., extension springs, etc.), or biasing elements may be used.

In the preferred embodiment, the linkage system 18 includes a pawl 40 and ratcheting sector (or "ratchet") 42 that cooperate to prevent back-drive. That is to say, the pawl 40 and sector 42 define pluralities of sloped teeth that slidingly slip past each other in one direction but inter-lock in the other. As such, it is appreciated that the headrest 10 will support the head 12 at any point along its translation, irrespective of where it is engaged. The sector 42 is pivotally coupled to the carrier plate 30 and caused to swing within a cutout defined thereby, when the arms 32, which are fixedly coupled to the sector 42, are caused to pivot. The pawl 40 is also pivotally coupled to the plate 30 and engages the sector 42 within the cutout. The pawl 40 is preferably spring biased towards the sector 42.

A manual or autonomous reset mechanism is further provided to disengage the pawl 40 and sector 42, and allow the headrest 10 to return to the stowed condition (i.e., back-drive). For example, and as shown in FIGS. 2-3, the reset mechanism may include an over-travel cam 44 pivotally coupled to the rear end of the pawl 40 and a channel 46 defined by the sector 42. The cam 44 is configured to be received within, and is preferably spring biased towards the channel 46. During deployment, the cam 44 slidingly rides along the channel 46 bearing against the floor of the channel 46. At a distal end of the floor, a depression 46a is defined, which location corresponds to the overshoot of maximum deployment. That is to say, the floor of the channel 46 deepens (or terminates) when the channel 46, which is integral with the arms 32, is caused to travel past the maximum deployment position. At this location, the biased cam 44 toggles past center (i.e., "flip") before coming to rest in a more vertical orientation. In this configuration, when the headrest 10 is manually caused to travel back towards the stowed position, the cam 44 causes the pawl 40 and sector 42 to separate thereby allowing motion. FIGS. 4a-c illustrate this process.

Whereas, the ratchet 42 and pawl 40 cooperatively prevent motion in only one direction, a latch 48, integrated, for example, into the carrier plate 30 and outer shell 18, is configured to prevent direction in both the fore and aft directions. As such, the latch 48 is configured to lock the headrest 10 in a desired position. In the illustrated embodiment, the latch 48 is configured to engage, so as to retain the shell 18 in the stowed or deployed position, and consists of a prong 50 biased towards a member (e.g., pin, etc.) 52 fixed relative to the shell 18. The latch 48 is selectively caused to disengage the pin 52, so that deployment is enabled. As illustrated in FIG. 3, the latch 48 and pin 52 inter-engage through another cut-out defined by the carrier plate 30.

The preferred carrier plate 30 also defines at least one travel stop 54 configured to engage the arms 32, so as to prevent further motion thereby, when in the fully deployed position. In FIG. 2, two travel stops 38 project forwardly from the plate 30, and within cut-outs defined by the upper arm 32a and sector 42. The sector 42 presents two rear wings 56 (FIG. 3) that are configured to catch the stops 54, when in the fully deployed position.

As previously stated, the actuator 14 overcomes many of the disadvantages of conventional active headrest actuators. For example, a relatively smaller volume, lower power requirement, and increased distributed actuation capability are some of the solutions offered by the inventive actuator 14. The actuator 14 includes an active material element 14a that may be drivenly coupled to the bar-linkage system 16 (as optionally shown in FIG. 2), or configured to cause the release of energy that results in the displacement of the swing arms 32. With respect to the latter and as show in FIGS. 2-3, a single shape memory (e.g., SMA) bowstring wire 14a may be used to release the latch 48, after energy is manually stored within the spring(s) 36,38 by pushing the headrest 10 back to the stowed position.

More particularly, the shape memory wire 14a when activated (i.e., exposed to an activation signal sufficient to cause a transformation in state) pulls the biased latch 48 away from the pin 52. As installed, an SMA wire 14a is preferably pre-stretched up to 8% based on commercially available shape memory alloys, to remove slack and provide more instantaneous action. The length of the shape memory alloy wire 14a is chosen such that when partially (e.g., 50%, more preferably 25%, most preferably 10%) activated (e.g., through resistive thermal heating, and the like) the change in length causes the latch 48 to completely lift from the pin 52. The latch 48 may define multiple recesses (not shown) within each of which the pin 52 is insertable, so as to result in a plurality of achievable fixed deployed positions.

Finally, it is appreciated that a power source 58 is communicatively coupled to the actuator 14, and operable to generate the activation signal (FIG. 1). In an automotive application, for example, the source 58 may be the vehicle charging system or a capacitor (also not shown) operable to effect a sufficient discharge of energy. Moreover, the preferred actuator 14 is autonomously triggered upon determining a condition to reduce the spacing between the headrest 10 and head 12 and/or change the compliance of the headrest. For example, the headrest 10 may be configured to respond to a dynamic load of the occupant generated by the inertial transfer during an automotive sudden stop event or to an otherwise determined pre-crash condition. As such, a controller 60 and sensor 62 may communicatively coupled to the actuator 14 and source 58 (FIG. 1). The controller 60 and sensor 62 are cooperatively configured to cause the actuator 14 to become exposed to the signal.

In one embodiment, a position sensor (capacitance, ultrasonic, radar, camera, and the like) 62 may be provided on the vehicle, e.g., near or within the seatback 22 to determine the position of the head 12. Here, the controller 60 may be designed to adjust the position of the headrest 10 based on the determined position of the head 12. The change in spatial distance provided by active material actuation can also allow the headrest 10 to be selectively tuned based on the sensor input. For example, the anthropometry properties of the occupant, e.g., weight, height, size, weight distribution, and the like, as well as seated geometry, e.g., leaning back, leaning forward, head location with respect to the headrest 10, and the like can be input variables for displacing the headrest 10 at an appropriate time and amount. Other exemplary sensors, including pressure sensors, displacement sensors, velocity sensors, accelerometers, and the like can be located in and about the vehicle seat and headrest 10 and in operative communication with the controller 60. Lastly, a pre-set occupant identification feature could be used equivalent to the seat memory selection switch to autonomously position the headrest 10 on demand.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims. Further description, explanation, and exemplary embodiments offered by the various appendices attached hereto are hereby incorporated by reference, as exemplary but non-limiting teachings of the present invention.

What is claimed is:

1. An active headrest adapted for use with a seat, and to selectively support the head of an occupant, said headrest comprising:
    an exterior shell defining an interior space and outer surface configured to engage the head of the occupant;
    an actuator disposed within the space, and operable to adjust the distance or engagement between the surface and head, wherein the actuator includes a bar linkage system presenting at least one selectively deployable swing arm pivotally coupled to the seat and shell, and further includes an active material element drivenly coupled to the arm, so as to selectively cause or enable the arm to pivot, when the element is exposed to or occluded from an activation signal; and
    a power source communicatively coupled to the actuator, and operable to generate the signal,
    wherein the actuator further includes a selectively engaged ratchet and pawl cooperatively configured to allow the headrest to translate in a first direction and prevent translation in the opposite direction when engaged, the ratchet defines a channel section having a distal depression, the pawl includes a cam configured to slidingly engage the channel during translation in the first direction, and the channel and cam are cooperatively configured to cause the ratchet and pawl to disengage, so as to allow translation in the opposite direction, when the cam engages the depression.

2. The headrest as claimed in claim 1, wherein the system is configured such that pivoting said at least one arm causes the shell to translate forward and upward.

3. The headrest as claimed in claim 1, wherein the source is selected from the group consisting essentially of a vehicle charging system, and a capacitor having stored energy.

4. The headrest as claimed in claim 1, wherein the shell is formed by front and back halves, the system is drivenly coupled to the front half, such that pivoting the arm causes only the front half to translate.

5. The headrest as claimed in claim 1, wherein said at least one arm engages, so as to be prevented from further motion, by at least one stop in the deployed position.

6. The headrest as claimed in claim 1, wherein said actuator includes at least one torsion spring engaging said at least one arm, so as to bias said at least one arm and headrest towards a deployed position.

7. The headrest as claimed in claim 1, wherein the element is a shape memory alloy wire.

8. The headrest as claimed in claim 7, wherein the wire presents a bow-string configuration.

9. The headrest as claimed in claim 1, further comprising:
    a main carrier plate fixedly coupled to the seat, and disposed within the space, wherein
    said at least one arm is pivotally coupled to the plate.

10. The headrest as claimed in claim 1, wherein a plurality of inter-linked swing arms including at least one upper and lower arm is configured to congruently pivot and cooperatively cause the shell to translate, when the element is exposed to or occluded from the signal.

11. The headrest as claimed in claim 10, wherein the actuator includes a parallel four-bar linkage system.

12. The headrest as claimed in claim 10, wherein the lower arm is replaced by a torsion spring pivotally coupled to the seat and shell, and the spring is configured to store energy when the shell translates relative to the seat.

13. The headrest as claimed in claim 1, wherein the actuator further includes a latch operable to selectively engage, so as to retain the shell in a stowed or deployed position, the element is configured to cause the latch and shell to disengage when exposed to or occluded from the signal, and the actuator is configured to cause the arm and headrest to translate only when the latch and shell are disengaged.

14. The headrest as claimed in claim 13, wherein the headrest and system are configured to achieve one of a plurality of deployed positions, and the latch is configured to retain the headrest in each of said plurality of deployed positions.

15. The headrest as claimed in claim 1, wherein the ratchet presents a pivotal sector defining exterior teeth, and said at least one arm and ratchet present an integral structure that congruently translates.

16. The headrest as claimed in claim 1, wherein the pawl is spring biased towards the ratchet, and/or the cam is spring biased towards the channel.

* * * * *